United States Patent
Wang et al.

(10) Patent No.: US 6,565,748 B1
(45) Date of Patent: *May 20, 2003

(54) CATIONICALLY CHARGE-MODIFIED MEMBRANES

(75) Inventors: I-fan Wang, San Diego, CA (US); Robert Zepf, Solana Beach, CA (US)

(73) Assignee: Pall Corporation, East Hills, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,412

(22) Filed: Jan. 14, 2000

Related U.S. Application Data

(63) Continuation of application No. 08/889,351, filed on Jul. 8, 1997, now Pat. No. 6,045,694.
(60) Provisional application No. 60/021,369, filed on Jul. 8, 1996.

(51) Int. Cl.[7] .............................................. B01D 39/00
(52) U.S. Cl. ........................ 210/500.38; 210/500.29; 210/500.41; 210/500.36; 210/500.42; 210/500.37; 264/41; 264/48; 264/49
(58) Field of Search ...................... 210/500.37, 500.38, 210/500.36, 500.41, 500.43, 500.29, 500.42; 264/41, 48, 49

(56) References Cited

U.S. PATENT DOCUMENTS

| | | |
|---|---|---|
| 3,808,305 A | 4/1974 | Gregor |
| 4,012,324 A | 3/1977 | Gregor |
| 4,125,462 A | 11/1978 | Latty |
| 4,473,474 A * | 9/1984 | Ostreicher et al. |
| 4,629,563 A | 12/1986 | Wrasidlo |
| 4,673,504 A * | 6/1987 | Ostreicher et al. |
| 4,737,291 A | 4/1988 | Barnes, Jr. et al. |
| 4,743,418 A | 5/1988 | Barnes, Jr. et al. |
| 4,778,596 A * | 10/1988 | Linder et al. |
| 4,797,187 A | 1/1989 | Davis et al. |
| 4,839,203 A | 6/1989 | Davis et al. |
| 5,004,543 A | 4/1991 | Pluskal et al. |
| 5,024,765 A | 6/1991 | Linder et al. |
| 5,098,569 A | 3/1992 | Stedronsky |
| 5,137,633 A | 8/1992 | Wang |
| 5,151,189 A | 9/1992 | Hu et al. |
| 5,269,931 A | 12/1993 | Hu et al. |
| 5,282,971 A | 2/1994 | Degen et al. |
| 5,462,667 A | 10/1995 | Wollinsky et al. |
| 5,462,867 A | 10/1995 | Azad et al. |
| 5,464,538 A | 11/1995 | Schmidt et al. |
| 5,503,746 A | 4/1996 | Gagnon |
| 5,531,893 A | 7/1996 | Hu et al. |
| 5,543,054 A | 8/1996 | Charkoudian et al. |
| 5,633,300 A | 5/1997 | Dasgupta |
| 6,045,694 A * | 4/2000 | Wang et al. |

FOREIGN PATENT DOCUMENTS

| | | |
|---|---|---|
| WO | WO 95/23640 | 9/1995 |
| WO | WO 96/34673 | 11/1996 |
| WO | WO 96/40421 | 12/1996 |
| WO | WO 97/26134 | 7/1997 |

OTHER PUBLICATIONS

European Search Report; Application No. EP 01 11 1754.
European Search Report; Application No. EP 00 10 2545.

\* cited by examiner

*Primary Examiner*—Ana Fortuna
(74) *Attorney, Agent, or Firm*—Knobbe, Martens, Olson & Bear, LLP

(57) ABSTRACT

The present invention relates to cationically charge-modified membranes and methods of preparing such membranes. In one major aspect of the invention, the membranes are hydrophobic membranes that are treated with one or more polymeric wetting agents to render the membranes substantially hydrophilic, followed by treatment with one or more charge-modifying agents, the agents causing the membranes to possess a fixed formal positive charge. In another major aspect of the invention, a cationic membrane is formed from casting in a film a mixed polymer solution comprising a sulfone polymer and a copolymer of vinylpyrrolidone and a cationic imidazolinium compound, and quenching the film in an aqueous bath to produce a coagulated membrane. The membrane can be further cationically charge-modified with one or more charge-modifying agents.

47 Claims, 1 Drawing Sheet

PMDAA-epi resin
(second charge-modifying agent)

+ <div style="display:inline"></div> +

<i>or</i> amine wetting agent
or first charge-modifying agent hydroxyl wetting agent
or first charge-modifying agent crosslinked cationic complex crosslinked cationic complex

CATIONICALLY CHARGE-MODIFIED MEMBRANES

This application claims priority from U.S. Provisional Patent Application Ser. No. 60/021,369, entitled "Cationically-Charge Modified Membranes," filed Jul. 8, 1996, and is a continuation of U.S. patent application Ser. No. 08/889,351 filed Jul. 8, 1997, now U.S. Pat. No. 6,045,694.

BACKGROUND OF THE INVENTION

1. Field of the Invention

The present invention relates to cationically charge-modified membranes and processes to prepare such membranes. Cationic charge-modified membranes disclosed herein are produced via post-treatment of formed hydrophilic or hydrophobic membranes or are produced from membrane casting processes incorporating cationic components.

2. Background of the Technology

Cationically charge-modified membranes are useful in the removal of a variety of materials from solutions and also in certain biotechnological applications. For example, positively charged membranes are useful in the removal of endotoxins from solutions. Endotoxins are toxic substances often derived from bacterial lysates. In addition, such membranes have found utility in the removal of negatively charged species from feed-streams, such as in the preparation of ultrapure water for the semiconductor industry.

Ultrafiltration and microfiltration membranes utilized in industry, particularly in the food processing industry and in environmental applications, are typically hydrophobic membranes which may be surface-modified with a hydrophilic material to reduce fouling and to confer additional desirable properties to the membrane. Membranes may be isotropic or asymmetric (anisotropic) in their pore structure. Isotropic membranes have a uniform pore structure throughout the membrane. Asymmetric membranes do not have a uniform pore structure throughout the membrane. Asymmetric porous membranes are distinguished from isotropic, homogeneous membrane structures whose flow and retention properties are independent of flow direction. Asymmetric membranes are useful in microfiltration, ultrafiltration, and reverse osmosis processes.

Several different processes and reagents have been utilized to produce cationically charge-modified, initially hydrophilic or hydrophobic membranes, and related membranes.

U.S. Pat. No. 4,012,324 to Gregor discloses casting formulations including a matrix polymer, a polyelectrolyte, a solvent, and a chemical cross-linking agent. Membranes are formed therefrom through a process of evaporating the solvent to form a membrane of uniform porosity and macroscopic homogeneity, having fixed anionic or cationic charges and a water content of from about 15 to about 75%. Membranes with substantial equilibrium water content are known as hydrogels and are subject to loss of water unless protected prior to use and additionally have limited application.

U.S. Pat. No. 4,673,504 to Ostreicher, et al., discloses cationic charge-modified microporous membranes that are produced from hydrophilic organic polymeric microporous membranes. These microporous membranes are hydrophilic and isotropic, with uniform pore structure throughout the membrane. All hydrophobic membranes as well as anisotropic hydrophilic membranes are excluded from the '504 patent.

In U.S. Pat. Nos. 4,737,291 and 4,743,418 to Barnes, Jr., et al., hydrophilic membranes which absorb or adsorb water and which contain hydroxyl, carboxyl or amino substituents are cationically modified and chemically crosslinked. Again, all hydrophobic membranes are excluded from the '291 and '418 patents.

U.S. Pat. No. 4,797,187 to Davis, et al., discloses a method to prepare ionically bonded coacervate layer membranes having improved selectivity. However, the invention of the '187 patent does not produce cationically charge-modified membranes as final products.

In U.S. Pat. No. 5,004,543 to Pluskal et al., hydrophobic substrates, comprising hydrophobic, microporous membranes having a crosslinked, cationic charge-modified coating are disclosed. The microporous membranes of the '543 patent are substantially isotropic, with a pore structure that is substantially uniform throughout the membrane. Charge-modified, hydrophobic membrane materials as disclosed in the '543 patent do not wet instantly when immersed into aqueous solutions. Monomeric, lower molecular weight wetting agents such as those utilized in the '543 patent are generally less efficient than higher molecular weight polymeric wetting agents for surface wetting, due to the production of much thinner surface adsorbed film layers and often also due to the production of layers with incomplete surface coverage.

U.S. Pat. No. 5,098,569 to Stedronsky discloses surface-modified polymeric support membranes and a process for preparing a surface-modified membrane. Membranes are preferably hydrophobic and are surface-modified via the irreversible adsorption of a monomolecular layer of an activated modifying polymer. The Stedronsky patent employs a multistep process for preparing a surface modified membrane which consists of a polysaccharide, chemically crosslinked, modified surface which is not cationic.

U.S. Pat. No. 5,151,189 to Hu, et al., discloses cationic charge-modified microporous hydrophilic membranes, as well as preparation of the same by post-treatment. The post-treatment process of the '189 patent begins with an inherently hydrophobic membrane made hydrophilic during manufacture with an intrinsic wetting agent such as polyvinylpyrrolidone or polyethylene glycol. It is desirable from the perspective of simplicity to avoid additives such as PVP and PEG which rely upon latently reactive functional groups to enhance hydrophilicity. Additionally, PVP and PEG are known to have lower surface adhesion to selected hydrophobic surfaces than other polymers with hydrophilic functional groups.

U.S. Pat. No. 5,282,971 to Degen, et al., discloses a filter medium comprising microporous polyvinylidene fluoride membrane and a polymer containing positively charged quaternary ammonium groups covalently bonded to the membrane, and a method of using the membrane. The '971 patent relies upon careful control of polymerization reagents and a polymerization process, most often employing ionizing radiation, to produce a final membrane with the desired properties.

U.S. Pat. No. 5,531,893 to Hu, et al., discloses a hydrophilic charged modified microporous membrane having a crosslinked structure of an interpenetrating polymer network. The membrane comprises a homogeneous matrix of polyether sulfone (PES), polyfunctional glycidyl ether, and a polymeric amine such as polyethyleneimine (PEI) and like polyamines, and polyethylene glycol. A shortcoming of the '893 patent is that membranes heated for the stabilization of the network structure have a lower cationic charge density.

This is stated to be due to gradual decomposition of crosslinked PEI adduct in the membrane structure.

Thus, while it can be seen that various different processes and reagents have been utilized to produce cationically charge-modified membranes, each of the cited references has one or more undesirable features. None of the cited references combines initially hydrophobic membranes with optimal polymeric wetting agents and cationic charge-modifying agents in a simple process to produce a stable, cationically charge-modified, isotropic or anisotropic, optionally non-hydrogel membrane. Additionally, none of the cited references produces stable, cationically charge-modified, isotropic or anisotropic, optionally non-hydrogel membranes in a simple casting process without chemical crosslinking agents. Accordingly, there remains a need for improved, stable, cationically charged membranes which possess a plurality of fixed formal positive charges that can be readily produced from initially hydrophobic membranes or from polymer starting materials in a casting process without complication or expensive apparatus and which are not restricted to isotropic or hydrogel membrane types.

SUMMARY OF THE INVENTION

It is an object of the present invention to provide charge-modified membranes bearing a positive charge. The membranes disclosed herein are positively charged either by chemical post-treatment of an already formed membrane, or by co-casting a new membrane with charge-modifying agents. Accordingly, the present invention contemplates multiple means of achieving the object of providing positively charged membranes.

The present invention provides a charge-modified polymer membrane made from a hydrophobic polymer, wherein the membrane is rendered hydrophilic by contacting the membrane with at least one polymeric wetting agent and then crosslinking at least one cationic charge-modifying agent to the membrane. In this aspect of the invention, the polymeric wetting agent may be polyvinylalcohol or a cellulosic polymer with a hydrophilic functional group. In a preferred embodiment, the cellulosic polymer may be hydroxypropylcellulose, hydroxypropylmethylcellulose, or methylcellulose.

The cationic charge modifying agent may include a first agent or a second agent, or both the first and the second agent in combination. The first agent may be a polyamine or an aziridine-ethylene oxide copolymer, and the second agent may be an epichlorohydrin-modified polyamine. In some embodiments, the first agent is free of any epoxide or epichlorohydrin chemical crosslinking substituents. In a preferred embodiment of this aspect of the invention, the first agent is hydroxyethylpolyethyleneimine. In preferred embodiments, the second agent may be Kymene 736, Kymene 450, and/or Reten 201. In the charge modification process the membrane may be contacted with the first agent and the second agent sequentially or simultaneously.

The hydrophobic polymer of the membrane may advantageously be a sulfone polymer, polyvinylidene difluoride, polytetrafluoroethylene, polypropylene, or polyethylene. Preferred sulfone polymers are polysulfone, polyarylsulfone, and polyethersulfone.

This aspect of the invention contemplates several forms of membranes, including, for example, cast polymer membranes, melt-blown polymer membranes, hollow fiber membranes, flat sheet membranes, and any form of membranes adapted for use in a cartridge. If the membrane is a melt-blown polymer membrane, the polymer may advantageously be polypropylene or polyethylene. Membranes of this aspect of the invention may possess a pore size of from about 0.00021 $\mu$m to about 10 $\mu$m. Preferred embodiments have pore sizes from about 0.01 to about 10 $\mu$m.

The crosslinking mentioned above may be energy-induced crosslinking, such as, for example, irradiating the membrane, or heating the membrane between about 70° C., and about 200° C., in contact with the cationic charge-modifying agent. The crosslinking may also be chemically-induced, which can involve a peroxide initiator or other catalyst, or can be initiated by a pH above 7.0. The crosslinking can also be achieved by drying the membrane in contact with the cationic charge-modifying agent.

A second aspect of the present invention provides a method of preparing a charge-modified polymer membrane by: providing a membrane with a hydrophobic polymer; contacting the membrane with at least one polymeric wetting agent; and crosslinking to the membrane at least one cationic charge-modifying agent. In this method, the polymeric wetting agent may be polyvinylalcohol or a cellulosic polymer with a hydrophilic functional group, and the cellulosic polymer may be hydroxypropylcellulose, hydroxypropylmethylcellulose, or methylcellulose.

The cationic charge modifying agent of the method includes a first agent or a second agent, or both the first and the second agent in combination. The first agent may include a polyamine or an aziridine-ethylene oxide copolymer, and the second agent may be an epichlorohydrin-modified polyamine. Preferably, the first agent is free of any epoxide or epichlorohydrin chemical crosslinking substituents, such as, for example, hydroxyethylpolyethyleneimine. The second agent may be Kymene 736, Kymene 450, and/or Reten 201. In the charge modification process the membrane may be contacted with the first agent and the second agent sequentially or simultaneously.

The hydrophobic polymer of the membrane may advantageously be a sulfone polymer, polyvinylidene difluoride, polytetrafluoroethylene, polypropylene, or polyethylene. Preferred sulfone polymers are polysulfone, polyarylsulfone, and polyethersulfone.

This aspect of the invention contemplates several forms of membranes, including, for example, cast polymer membranes, melt-blown polymer membranes, hollow fiber membranes, flat sheet membranes, and any form of membranes adapted for use in a cartridge. If the membrane is a melt-blown polymer membrane, the polymer may advantageously be polypropylene or polyethylene. Membranes of this aspect of the invention may possess a pore size of from about 0.00021 $\mu$m to about 10 $\mu$m. Preferred embodiments have pore sizes from about 0.01 to about 10 $\mu$m.

The crosslinking mentioned above may be energy-induced crosslinking, such as, for example, irradiating the membrane, or heating the membrane between about 70° C., and about 200° C., in contact with the cationic charge-modifying agent. The crosslinking may also be chemically-induced, which can involve a peroxide initiator or other catalyst, or can be initiated by a pH above 7.0. The crosslinking can also be achieved by drying the membrane in contact with the cationic charge-modifying agent.

A third aspect of the invention provides a positively charged polymer membrane. This membrane is cast from a formulation that includes a sulfone polymer and a copolymer of vinylpyrrolidone and a cationic imidazolinium compound. The formulation also includes a low molecular weight organic acid and a solvent. The sulfone polymer may be polysulfone, polyarylsulfone or polyethersulfone. The cationic imidazolinium compound may advantageously be methylvinylimidazoliummethyl sulfate. The acid may be selected from the group consisting of formic, acetic, propionic and butyric acid, and preferred solvents are N-methylpyrrolidone or dimethylformamide.

The formulation of this aspect of the invention included about 5–50 w/w % sulfone polymer and about 0.5–10.0 w/w % of the copolymer. In a preferred embodiment, the formulation contains about 10–25 w/w % polyethersulfone and about 1.0–5.0 w/w % copolymer of vinylpyrrolidone and methylvinylimidazoliummethyl sulfate. The membrane thus formed may optionally have at least one cationic charge-modifying agent crosslinked thereto. Such a cationic charge modifying agent may include a first agent or a second agent, or both the first and the second agent in combination. Preferred first agents include a polyamine or an aziridine-ethylene oxide copolymer, and preferred second agent are epichlorohydrin-modified polyamines. In some embodiments the first agent may be free of any epoxide or epichlorohydrin chemical crosslinking substituents, as in, for example, hydroxyethylpolyethyleneimine. The second agent may be selected from the group consisting of Kymene 736, Kymene 450, and Reten 201. The membrane may be crosslinked with the first agent and the second agent sequentially or simultaneously.

In a fourth aspect of the invention is provided a method of preparing a positively charged polymer membrane, employing the steps of: casting in a film a mixed polymer formulation containing a sulfone polymer, a copolymer of vinylpyrrolidone and a cationic imidazolinium compound, formulation also includes a low molecular weight organic acid and a solvent; and quenching the film in an aqueous bath to produce a coagulated membrane.

The sulfone polymer may be selected from the group consisting of polysulfone, polyarylsulfone and polyethersulfone. A preferred cationic imidazolinium compound is methylvinylimidazoliummethyl sulfate. The acid may be selected from the group consisting of formic, acetic, propionic and butyric acid, and the solvent may advantageously be N-methylpyrrolidone or dimethylformamide.

In one embodiment, the formulation contains about 5–50 w/w % sulfone polymer and about 0.5–10.0 w/w % copolymer. In a preferred embodiment, the formulation contains about 10–25 w/w % polyethersulfone and about 1.0–5.0 w/w % copolymer of vinylpyrrolidone and methylvinylimidazoliummethyl sulfate.

This method may include the further with a step of crosslinking to the coagulated membrane at least one cationic charge-modifying agent. Such a cationic charge modifying agent may include a first agent or a second agent, or both the first and the second agent in combination. The first agent may be a polyamine or an aziridine-ethylene oxide copolymer, and the second agent may be an epichlorohydrin-modified polyamine. A preferred first agent is free of any epoxide or epichlorohydrin chemical crosslinking substituents, as is true of, for example, hydroxyethylpolyethyleneimine. The second agent may be selected from the group consisting of Kymene 736, Kymene 450, and Reten 201. According to the method, the membrane may be crosslinked with the first agent and the second agent sequentially or simultaneously.

DETAILED DESCRIPTION OF THE INVENTION

Figure 1:
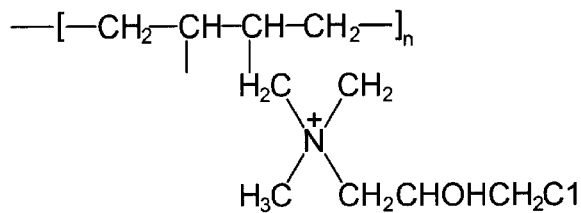
FIG. 1 is a drawing showing the reaction scheme for one embodiment of the invention illustrating chemical crosslinking of the first cationic charge-modifying agent (HEPEI) or wetting agent (HPC) with a second cationic charge-modifying agent, Kymene 736, an epichlorohydrin-modified polyamine resin.
Figure 1:
Figure 1:
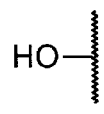
Figure 1:
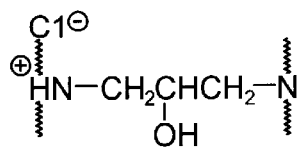
Figure 1:
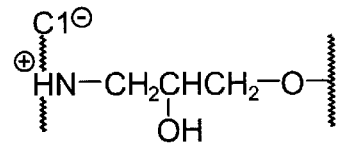

It is desirable to provide multiple means of preparing positively charged membranes. Because there are so many potential uses of such membranes, it is desirable to provide a way of post-treating a pre-formed membrane that has been selected to be otherwise already suitable for a particular application. Thus, the performance of membranes known to be useful in a given field may be enhanced by the method of the present invention.

Additionally, it is desirable to provide relatively simple formulations and manufacturing processes for preparation of membranes that carry a positive charge ab initio. Accordingly, disclosed herein are membrane formulations which, following conventional membrane casting procedures, produce membranes that are positively charged as cast.

It has been discovered that it is possible to prepare improved cationically charge-modified isotropic or anisotropic membranes that are readily and reproducibly produced through the simple treatment of a formed hydrophobic polymeric membrane with a polymeric wetting agent, such as hydroxypropylcellulose, to render the membrane hydrophilic, followed by simple treatment with agents or an agent possessing a plurality of fixed formal positive charges.

It has been discovered that in the post-treatment of formed membranes or in the quench or rinse bath treatment of cast membranes, it is not necessary to utilize a latently reactive polymeric wetting agent such as polyvinylpyrrolidone or polyethylene glycol or an activated modifying polymer such as a chlorohydrin derivative of hydroxypropylcellulose to render the initially hydrophobic membrane irreversibly hydrophilic. It has been discovered that an initially hydrophobic membrane may be made irreversibly hydrophilic through a simple contacting process with the improved polymeric wetting agents of the present invention, or alternatively with a contacting process followed by a simple heating process. Polymeric wetting agents are selected from the group consisting of polyvinylpyrrolidone and copolymers of pyrrolidone, hydroxypropylcellulose (HPC), hydroxypropylmethylcellulose, methylcellulose (Methocell™) and other cellulose polymers with hydrophilic functional groups, and polyvinyl alcohol (PVA), with HPC being particularly preferred.

In the method of the present invention for cationic charge modification of a formed initially hydrophobic membrane, the membrane is made hydrophilic with any of the improved polymeric wetting agents of the present invention, following which the membrane is simply contacted simultaneously with a first and second charge-modifying agent in aqueous solution for a brief period, following which the membrane is dried under thermal conditions designed to induce crosslinking which reduces leaching of the first and second charge-modifying agents from the membrane. The first cationic charge-modifying agent may be a polyamine, such as hydroxyethylated polyethyleneimine (HEPEI) or an aziridine-ethylene oxide copolymer. The second cationic charge-modifying agent may be either a high or low molecular weight epichlorohydrin-modified highly branched polyamine. Such polyamines preferably include the high molecular weight Kymene 736 and Kymene 450 resins and the Reten 201 (50,000 daltons) low molecular weight resin.

Such polyamines rely upon chemical crosslinking through the epichlorohydrin functional groups to achieve irreversible cationic charge modification, unlike the first cationic charge-modifying agents of the present invention. The molecular weight of the polyamine is typically selected based on the "openness" of the formed membrane. For example, higher molecular weight polyamines are preferably utilized in connection with relatively large pored microfiltration sheet or hollow fiber membranes or melt blown materials, while lower molecular weight compounds are utilized in connection with "tighter" pored membranes, such as membranes having pore sizes less than 0.02 $\mu$m. In addition, it has been discovered that if the polyamine is subjected to mild shear conditions prior to contact with the membrane, this assists in lowering the effective molecular weight of the polyamine polymer, perhaps by unwinding, disentangling, or breaking the polymer chains of the higher molecular weight polyamines.

A formed initially hydrophobic membrane made hydrophilic with any of the polymeric wetting agents of the present invention may also be contacted briefly with either the first or second charge-modifying agent alone in aqueous solution, following which the membrane is dried under thermal conditions to induce crosslinking, to produce a cationic charge-modified membrane.

It has also been discovered that sufficient cationic charge modification of a membrane can be achieved by producing a membrane by casting a polymer blend containing a sulfone polymer with a copolymer of vinylpyrrolidone and a cationic imidazolinium compound without the use of an epoxide crosslinking agent or an epichlorohydrin modified polyamine to ensure the formation of crosslinks between the sulfone polymer and the cationic polymer and within the cationic polymer. It has been discovered that sufficient irreversible cationic charge modification of a membrane produced by casting a polymer blend can be achieved without a chemically-induced crosslinking process altogether. The avoidance of chemical crosslinking agents in the aforementioned membrane manufacturing process is desirable from the environmental perspective to reduce the use of hazardous materials and production of hazardous waste. Additionally, it is known that unreacted chemical crosslinking agents in a finished membrane can cause membrane performance problems. It has been discovered in the present invention that a simple thermal-induced crosslinking of the cationic charge-modifying polymer with itself and the other components of the polymer blend can be employed to produce an irreversibly cationically charged membrane. Such cationic membranes exhibit a 99.9% anionic dye retention. Surprisingly, it has been discovered that such membranes produced by casting a polymer blend can also be post-treated with the aforementioned method of the present invention employing first and second cationic charge-modifying agents to further improve the retention of anionic dye.

Membranes of the present invention are useful in a variety of filtration applications, including the filtration of water and other fluids for electronics, pharmaceuticals, and biologics, as well as for endotoxin removal from secondary metabolite streams and blood filtration (including separation of leukocytes, lymphocytes, platelets, and the like).

Formed Membranes Suitable for Wetting and Charge Modification

Formed membranes that are suitable for wetting and charge modification in accordance with the present invention include virtually any formed initially hydrophobic polymer membrane that has sufficient porosity so as to allow treatment with the wetting and cationic charge-modifying agents or agent. Formed membranes are initially hydrophobic and are rendered hydrophilic through surface treatment with an effective amount of a polymeric wetting agent. More than one polymeric wetting agent may also be employed simultaneously. A wetting agent as used herein has the ability to cause a surface to have increased wettability by water. The wetting of solid surfaces by liquids is an important process for many industrial applications. Wetting, by definition, is the process of one fluid displacing another fluid at a solid surface. However, in most cases, the term is used to describe the displacement of air by a liquid. Generally, suitable wetting agents will contain hydrophilic chemical functional groups such as hydroxyl groups, carboxylic acid groups and the like. Polymeric wetting agents are selected from the group consisting of HPC, hydroxypropylmethylcellulose, Methocell™ and other cellulose polymers with hydrophilic functional groups, and PVA, with HPC being particularly preferred.

Formed membranes rendered hydrophilic in accordance with the invention that are suitable for charge modification in accordance with the invention preferably possess relatively quick water imbibing times. Imbibing times may be measured by applying a fixed amount of water onto the membrane and recording the time required for the water to be absorbed into the membrane.

Thus, treatment of formed hydrophobic membranes in accordance with the present invention with an effective amount of a wetting agent or agents results in hydrophilic membranes having imbibing times of between about 2 to about 10 seconds.

Preferred formed hydrophobic membranes include sheet and hollow fiber cast polymer membranes and melt blown polymer membranes. Membranes in accordance with this aspect of the invention typically possess porosities characteristic of ultrafiltration or microfiltration membranes, with pore sizes ranging from about 0.00021 $\mu$m to about 10 $\mu$m, and preferably from about 0.01 $\mu$m to about 10 $\mu$m. Viewed from another perspective, suitable membranes within the ultrafiltration range generally possess molecular weight cut-offs of from about 10,000 daltons to about 100,000 daltons and have pore sizes from 0.00021 to 0.0048 $\mu$m, whereas microfiltration membranes typically possess pore sizes of from at least about 0.01 $\mu$m through about 10 $\mu$m.

Any hydrophobic polymer that can be formed into a membrane by a casting, melt-blowing or other process, that possesses the pore size criteria described above and which can be rendered hydrophilic through treatment with the wetting agents described above, is generally acceptable in accordance with this aspect of the invention. Preferred polymers include sulfone polymers, such as polysulfone, polyarylsulfone, and polyethersulfone, fluorinated polymers, such as polyvinylidene difluoride (PVDF) and polytetrafluoroethylene (PTFE), polypropylene, and others such as polyethylene. Cast membranes are generally formed from sulfone polymers whereas melt blown membranes are generally formed from polypropylene or polyethylene. Cast membranes are preferably formed, without limitation, in accordance with Wrasidlo U.S. Pat. No. 4,629,563, or co-pending U.S. patent application Ser. No. 08/473,206, filed on Jun. 7, 1995; Ser. No. 08/476,189, filed Jun. 7, 1995; Ser. No. 08/484,216, filed on Jun. 7, 1995; Ser. No. 08/498,722, filed on Jul. 5, 1995; Ser. No. 08/661,839, filed Jun. 11, 1996; and Ser. No. 08/785,962, filed on Jan. 22, 1997. Melt blown membranes are preferably formed in accordance with U.S. patent application Ser. No. 08/433,006, filed on May 2, 1995. As such, preferred membranes utilized in accordance with the invention may possess pore size gradients through the cross-section of the membrane.

Charge-modifying Agents for Formed Membranes

In accordance with the invention, formed initially hydrophobic membranes rendered hydrophilic, as discussed above, are treated simultaneously with a first and second cationic charge-modifying agent and can optionally be treated with either the first or second cationic charge-modifying agent alone.

The First Cationic Charge-modifying Agent

In accordance with the invention, the first cationic charge-modifying agent is a polyamine or an aziridine-ethylene oxide copolymer. The polyamine and aziridine-ethylene oxide copolymer do not contain any epoxide or epichlorohydrin or like substituents capable of initiating chemical crosslinking with other functional groups or substituents. The polyamine is preferably selected from polyethyleneimine and like polyamines. The polyamine is most preferably an aliphatic polyamine having at least one secondary amine and a carboxyl or hydroxyl substituent. The aziridine-ethylene oxide copolymer contains at least one cationic aziridinium substituent as disclosed in U.S. Pat. No. 4,797,187 to Davis et al, such disclosure being incorporated herein by reference. In the most preferred embodiments, the first cationic charge-modifying agent is hydroxyethylated polyethyleneimine (HEPEI) having the general structure:

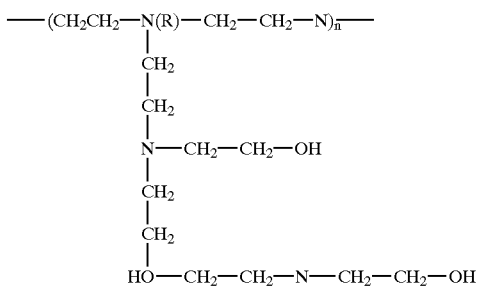

wherein R can be H or a continuation of the polymer chain. HEPEI is available from BASF Corporation, Mount Olive, N.J., under the trade name SC®-61B. Preferred HEPEI possesses a molecular weight of between about 40,000 and 80,000 daltons, with 60,000 daltons preferred. Low molecular weight polyethyleneimine compounds can also be employed. One example of the latter compounds is poly G-20, a low molecular weight polyethyleneimine.

Preferably the HEPEI is dissolved in a suitable aqueous solution along with the second cationic charge-modifying agent, the solution optionally containing buffers and other agents such as tonicity agents or electrolytes.

The Second Cationic Charge-modifying Agent

The second cationic charge-modifying agent which may be utilized in accordance with this invention may be characterized generally as a water soluble organic polymer having a molecular weight greater than about 1000 daltons, wherein the polymer has at least one epoxide or epichlorohydrin substituent capable of bonding to the first cationic charge-modifying agent or the surface of the wetting agent-modified membrane and wherein the polymer also has at least one tertiary amine or quaternary ammonium group capable of providing a cationic charge site. Preferably, the second cationic charge-modifying agent is an epichlorohydrin-modified polyamine, such as a polyamine epichlorohydrin resin, a polyamido-polyamine epichlorohydrin resin, or a resin based upon diallynitrogen-containing materials reacted with epichlorohydrin. Such resins typically are the reaction product of a polyamine with epichlorohydrin and have (i) tertiary amine or quaternary ammonium groups, and (ii) epoxide or epichlorohydrin groups along the polyamine chain capable of bonding to the first cationic charge-modifying agent or surface of the wetting agent-modified membrane. U.S. Pat. No. 4,673,504 to Ostreicher discloses cationic polyamine epichlorohydrin resins which are also suitable for use in the present invention, such disclosure being incorporated herein by reference. Depending upon the pore size of the membrane to be treated, either a high or a low molecular weight second cationic charge-modifying agent can be used. Examples of suitable epichlorohydrin-modified polyamines include the high molecular weight Kymene 736 and Kymene 450 resins and the Reten 201 (50 K MW) low molecular weight resin, all available from Hercules Co., Wilmington, Del. Kymene 736 is preferred. The chemical structure of this resin includes an epichlorohydrin-modified quaternary ammonium group.

As previously mentioned, it is possible to additionally utilize mild shear conditions with certain of these materials in order to reduce their effective molecular weight in order to allow the surface treatment of particular membranes. Thus, even when, for example, an ultrafiltration membrane having a very small pore size is desired to be treated, it is often possible to utilize higher than expected molecular weight second cationic charge-modifying agents by subjecting the second cationic charge-modifying agent to mild shear conditions.

Thus, in the most preferred embodiments of the present invention, HEPEI is utilized simultaneously with Kymene 736. Alternatively, either HEPEI or Kymene 736 may be used alone for cationic charge modification.

Process of Wetting and Charge Modification of Formed Membranes

In accordance with a preferred embodiment of the present invention, a formed hydrophobic membrane is (i) treated with a polymeric wetting agent, such as HPC (Krucel, available from Hercules Co., Wilmington, Del.) or Methocell™ (available from Dow Chemical Co., Midland, Mich.), to render it hydrophilic, (ii) dried, (iii) treated with a first and second charge-modifying agent or either agent alone, and (iv) dried, preferably with heat, which additionally induces crosslinking, thus minimizing leaching of the charge-modifying agents or agent.

With cast membranes, as will be appreciated, treatment with HPC can be conveniently accomplished in a quench or rinse bath immediately or shortly after casting. By way of example, a polysulfone based Wrasidlo-type unstable dispersion phase inversion formulation (see U.S. Pat. No. 4,629,563, Example II), can be cast onto an inert support and quenched using an aqueous bath including HPC (approximately 0.01 w/v % to about 0.5 w/v %) to form a highly anisotropic microfiltration membrane. The resulting membrane, following drying, is inherently hydrophilic, owing to the HPC treatment. A similar process can be utilized for the preparation of hollow fiber membranes.

It will be appreciated, however, that formed membranes (either sheet or hollow fiber) can also be post-treated with the wetting agent to obtain a hydrophilic membrane. In such a situation, the membrane simply can be dipped or submerged in, or otherwise passed through, an aqueous solution including the wetting agent, such as HPC. Alternatively, the wetting agent may be applied to the membrane by spraying or contacting a wick or roll along the surface of the microporous membrane. The aqueous solution generally includes approximately 0.01 w/v % to about 0.5% w/v of the wetting agent. Additionally, a low concentration of a surfactant such as Zonyl can be employed to assist in the initial aqueous wetting of the membrane by the wetting agent. Other non-ionic or anionic surfactants can also be utilized. A small amount of isopropyl alcohol (about 0.6 w/v %) can also be used to facilitate the wetting agent treatment of the membrane. Other low molecular weight solvents can also be utilized. With sheet and hollow fiber membranes, it is preferred to accomplish treatment in a bath containing the wetting agent. Alternatively, the membranes can be constructed into housings and the wetting agent circulated therethrough with a suitable pump, typically for a few minutes or longer as needed. The membranes can then be centrifuged for about 30 seconds to remove excess fluids and then oven dried at a suitable temperature and time, for example at 100° C. for four hours.

Similar results can be obtained through the treatment of melt blown polymeric membranes, such as those described in co-pending U.S. patent application Ser. No. 08/433,006, filed on May 2, 1995. One preferred membrane, for example, is a polypropylene membrane prepared in accordance with such applications. In such a case, it is convenient to prepare cartridges from the membranes and to circulate an aqueous solution containing a wetting agent, such as HPC, therethrough, again with a suitable pump, typically for a few minutes or longer as needed. Solutions used are those described above. The membranes can be dried as previously described following treatment with the wetting agent. Upon drying, the membranes are inherently hydrophilic, owing to the HPC treatment.

Once the membrane is formed, rendered hydrophilic, and preferably is dried, the membrane is ready for charge modification. In a preferred embodiment, the membrane is contacted with an effective amount of the first and second charge-modifying agent simultaneously or either agent alone in an aqueous solution. The method of contacting the membrane with the charge-modifying agents or agent can be a simple dip-coating process wherein the membrane is dipped into the aqueous solution containing the charge-modifying agents or agent for a few seconds, or for a period of time sufficient to effect the desired degree of coating. Alternatively, the charge-modifying agents may be applied by spraying or contacting a wick or roll along the surface of the microporous membrane. An effective amount of a cationic charge-modifying agent generally is a concentration of the first and second charge-modifying agent, or either agent alone, of between about 0.1 w/v % and about 5.0 w/v %, and preferably between about 1.0 w/v % and about 3.0 w/v %. For example, in a preferred embodiment, where HEPEI and Kymene 736 are used as the first and second charge-modifying agent, respectively, a membrane is contacted with an aqueous solution containing 1 w/v % HEPEI and 1.2 w/v % Kymene 736. The membrane is typically contacted with the charge-modifying agents for between 1 second and 60 seconds. Longer periods of contact generally are not required, but could be used. The pH of the aqueous solution containing the charge-modifying agents or agent typically is adjusted to optimize the interaction of the charge-modifying agent with the membrane. In the preferred embodiment wherein HEPEI and Kymene 736 are used as the first and second charge-modifying agent, respectively, a membrane can be contacted with an aqueous solution with a pH between about 8 and about 8.5.

With sheet and hollow fiber membranes, it is preferred to accomplish treatment in a bath containing the charge-modifying agents or agent. Alternatively, the membranes can be constructed into housings and the charge-modifying agents circulated therethrough with a suitable pump, such as a gear pump, over the course of a few minutes. This latter process is preferably used in connection with melt blown membrane materials.

Following treatment with the first and second charge-modifying agent or either agent alone, the membrane is dried under thermal conditions designed to crosslink the charge-modifying agents or agent to the membrane, which reduces leaching of the charge-modifying agents or agent from the membrane. Thermal conditions can range from about room temperature to about 150° C. or more, the lowest temperature being determined by leaching tests and the highest temperature being determined by the inherent temperature stability of the membrane as well as by leaching tests. Generally, a drying time of several minutes to several hours is required, with longer drying times being needed at lower temperatures. The precise temperature and amount of drying time required can be determined through conventional experimentation including tests of charge-modifying agent leaching. Where HEPEI and an epichlorohydrin-modified polyamine are used as the first and second charge-modifying agents respectively, thermal crosslinking is preferably accomplished at a temperature between about 100° C. and about 150° C., and more preferably at a temperature between about 110° C. and about 140° C.

Preferred Cationically Modified Membranes

As discussed above, in preferred embodiments of the invention, formed membranes are rendered hydrophilic with HPC and charge-modification is accomplished through the utilization of HEPEI and Kymene 736. A membrane formed in this manner offers a variety of benefits. One of the primary benefits offered through use of the above combination of reagents is that the formed membrane has plural sites of interaction in which fixed formal positive charges are presented on the membrane surface and are capable of interacting with a fluid being filtered. This results in a more specific and more efficient membrane filtration. The chemistry of such an interaction is shown in FIG. 1 in which the reaction scheme for crosslinking HEPEI or HPC and Kymene 736 is provided.

Cationic Membranes Formed from Casting a Mixed Polymer Solution

Further aspects of the invention provide a cationic charge-modified membrane and a process to prepare such a membrane by casting in a film a mixed polymer solution containing a sulfone polymer, a copolymer of vinylpyrrolidone and a cationic imidazolinium compound, a low molecular weight organic acid and a solvent, quenching the resulting film in an aqueous bath, and washing and drying the coagulated membrane. Conventional film casting, quenching, rinsing and drying procedures are employed. In a preferred embodiment, the sulfone polymer may be selected from the group consisting of polysulfone, polyarylsulfone and polyethersulfone. Polyethersulfone is preferred. Polyethersulfone can be employed with the chemical structure and molecular weight range as described in U.S. Pat. No. 5,531,893 to Hu, et al., such disclosure being incorporated herein by reference. Generally, a concentration between about 5 and about 50% by weight of sulfone polymer may be employed in the polymer solution. Preferably, a concentration between about 10 and about 25% by weight is employed. Most preferably, a concentration of about 15% by weight of sulfone polymer is employed. The copolymer of vinylpyrrolidone and a cationic imidazolinium compound may be any copolymer containing any number of repeating vinylpyrrolidone groups and imidazolinium groups. In a preferred embodiment, the copolymer of vinylpyrrolidone and a cationic imidazolinium compound is a terpolymer of vinyl caprolactam, vinylpyrrolidone and methylvinylimidazoliummethyl sulfate. Generally, a concentration between about 0.5 and about 10% by weight of copolymer may be employed in the polymer solution. Preferably, a concentration between about 1.0 and about 5% by weight is employed. Most preferably, a concentration of 1.0–2.0% by weight of copolymer is employed. In another preferred embodiment, the low molecular weight organic acid is selected from the group consisting of formic, acetic, propionic and butyric acid. Propionic acid is preferred. Generally, a concentration between about 10 and about 60% by weight of acid may be employed in the polymer solution. Preferably, a concentration between about 25 and about 45% by weight is employed. Most preferably, a concentration of about 34–35% by weight of acid is employed. In another preferred embodiment, the solvent is N-methylpyrrolidone or dimethylformamide. N-methylpyrrolidone is preferred. Generally, a concentration between about 10 and about 60% by weight of solvent may be employed in the polymer solution. Preferably, a concentration between about 25 and about 55% by weight is employed. Most preferably, a concentration of about 49% by weight of solvent is employed. In another embodiment, the mixed polymer solution may be 5–50 w/w % sulfone polymer and 0.5–10.0 w/w % copolymer of vinylpyrrolidone and a vinylimidazole compound. In an additional embodiment, the mixed polymer solution may be 10–25 w/w % polyethersulfone and 1.0–5.0 w/w % copolymer of vinylpyrrolidone and methylvinylimidazoliummethyl sulfate.

In another embodiment, the washed and dried membrane is simultaneously charge-modified through treatment with an effective amount of a first and second cationic charge-modifying agent, or first or second charge-modifying agent alone. The first cationic charge-modifying agent may be a polyamine or an aziridine-ethylene oxide copolymer as previously described, the first cationic charge-modifying agent being free of any epoxide or epichlorohydrin or like chemical crosslinking substituents and the second cationic charge-modifying agent being an epichlorohydrin-modified polyamine as previously described. In a preferred embodiment, the first cationic charge-modifying agent may be HEPEI. In another preferred embodiment, the second cationic charge-modifying agent may be selected from the group consisting of Kymene 736, Kymene 450, and Reten 201. The amount of first and second cationic charge-modifying agent which can be employed is an amount as previously described for the treatment of formed hydrophilic membranes. The process for employing the aforementioned charge-modifying agents is also as previously described for the treatment of formed membranes. Following cationic charge modification, the membrane is subjected to thermal conditions designed to thermally and chemically crosslink the charge-modifying agents to the membrane as previously described.

EXAMPLES

The following examples are provided to illustrate the present invention. However, such examples are merely illustrative and are not intended to limit the subject matter of the application. All chemical concentration percentages are w/v % unless otherwise indicated.

Example I

Preparation of Cationically Modified Microporous Melt Blown Membranes Without Pretreatment With a Polymeric Wetting Agent Microporous melt blown polymer membranes not rendered hydrophilic were cationically modified in accordance with the invention as follows: One (1) $\mu$m and three (3) $\mu$m microporous melt blown polymer membrane cartridges were obtained from Memtec Filterite Division of Timonium, Md. The cartridges were treated with an aqueous charge-modifying solution containing 0.8% HEPEI and 1.2% Kymene 736. Treatment was accomplished by circulating the solution through the cartridges with a gear pump over the course of two minutes at room temperature. Thereafter, the cartridges were centrifuged for approximately 30 seconds to remove excess liquid and then dried in an oven at 100° C., for at least four hours.

The cartridges were rinsed with deionized water and were tested for water flow rates as well as anionic dye retention as follows: After drying, 25 mm diameter disks of the membrane samples were prepared and the membranes were tested for retention of an anionic dye (Metanil Yellow) in an Amicon test cell at a pressure of 6-psid. Anionic dye absorption or retention is a well known method for assessing the cationic potential of a membrane. In the test, a fixed quantity (usually from 10 to 100 ml) of a standard solution containing an anionic dye (10 ppm) is run through the test sample and the quantity of dye that passes through the membrane is measured using a uv/visible light spectrophotometer.

In addition to anionic dye absorption, the membrane samples were also analyzed for water flow rates using standard volumetric techniques and for mean flow pore size (MFP) using a Coulter porometer.

None of the cartridges showed any change in water flow rate. However, none of the cartridges was able to effectively remove 99.9% of the dye from more than 10 ml of test dye solution. This indicates an insufficient cationic charge modification.

Example II

Preparation of Cationically Modified Microporous Melt Blown Membranes Following Pretreatment with HPC A process similar to that described in Example I was used in the present Example. However, prior to treatment with the charge-modifying solution, the membranes were pretreated with HPC to render them hydrophilic prior to reaction with the charge-modifying agent. Thus, 1 $\mu$m and 3 $\mu$m microporous melt blown polymer membrane cartridges were treated with a solution of HPC (containing Krucell HPC, Zonyl (a surfactant that assists in wetting the membrane for HPC treatment), and isopropyl alcohol). Treatment was accomplished by circulating the solution through the cartridges with a gear pump for approximately two minutes at ambient temperature. The cartridges were then centrifuged for 30 seconds to remove excess fluids and oven dried at 100° C., for four hours. The resulting cartridges had very hydrophilic surface characteristics.

Thereafter, the cartridges were treated with a charge-modifying solution as described in Example I (0.8% HEPEI and 1.2% Kymene 450), centrifuged for 30 seconds to remove excess fluid, and dried in an oven at 100° C. for at least four hours. The cartridges were rinsed with deionized water and tested for water flow rate as well as anionic dye retention. While no significant changes in water flow were observed, the cartridges effectively removed 99.9% of dye from more than 10 ml of test dye solution. The results of Examples I and II show that membranes pre-treated with wetting agents remove anionic dye from a test solution more efficiently than membranes without the wetting agent treatment. This illustrates the utility of including the step of treating membranes with polymeric wetting agents to render them hydrophilic.

Example III

Optimization of Cationic Charge Modification

Several polysulfone membrane samples (0.2 μm average surface pore size, available from Memtec America Corporation), obtained from roll stock that had previously been rendered hydrophilic by treatment with HPC, were charge-modified in accordance with the invention. HPC treatment was accomplished as previously described in a quench bath during the manufacture of the cast membranes. The concentration of the HPC in the quench bath was approximately 0.04%.

Membrane samples were treated with various concentrations of the charge-modifying agents and dried under heat to induce crosslinking. The charge-modifying agents used in the experiments were HEPEI and Kymene 736, used together or separately. The results for the experiments are shown in Table I and are also described below:

TABLE 1

| Example No. | Membrane Type and Treatment | Anionic Dye Retention (%) | Dye Solution Flow Rate (ml/min) | Coulter MFP Size (μm) |
|---|---|---|---|---|
| 3a | BTS-55, 0.2 μm; no treatment | 20.9 | 25.1 | 0.15 |
| 3b | BTS-55, 0.2 μm; 1% HEPEI and 0.75% Kymene 450; crosslinked at 145° C. for 3 minutes | 99.8 | 23.1 | 0.2 |
| 3c | BTS-55, 0.2 μm; 3.0% Kymene 450; crosslinked at 145° C. for 3 minutes | 99.8 | 4.0 | NA |
| 3d | BTS-55, 0.2 μm; 1% HEPEI and 0.4% Kymene 450; crosslinked at 145° C. for 3 minutes | 99.8 | 21.4 | 0.22 |
| 3e | BTS-55, 0.2 μm; 1% HEPEI and 0.4% Kymene 450; crosslinked at 145° C. for 6 minutes | 99.1 | 21.4 | 0.21 |
| 3f | BTS-55, 0.2 μm; 0.5% HEPEI and 1.3% Kymene 450; crosslinked at 145° C. for 3 minutes | 99.4 | 12.6 | 0.21 |
| 3g | BTS-55, 0.2 μm; 1% HEPEI and 1.2% Kymene 450; crosslinked at 140° C. for 3 minutes | 99.9 | 24 | 0.2 |
| 3h | Filter Grade 45, 0.2 μm; no treatment | 10 | 45 | 0.2 |
| 3i | Filter Grade 45, 0.2 μm; 1.0% HEPEI and 1.2% Kymene 736; crosslinked at 140° C. for 3 minutes | 99.9 | 45 | 0.21 |

As will be observed, the control samples (Samples 3a and 3h) retained minimal 10 amounts of the anionic dye, whereas treatment with HEPEI and Kymene 450 or Kymene 736 resulted in high levels of retention. It is possible that excessive Kymene may block pores and reduce water flow (see Sample 3c). This may be mitigated somewhat, however, by including HEPEI. Compare Sample 3c and Sample 3g. Further, more extended crosslinking appears to reduce the cationic potential of the membrane (see Sample 3e, having 99.1% anionic dye retention). The best cationic properties were observed with Samples 3g and 3i. In addition, those membranes also possessed the best water flows.

Additionally, a Filtertek 45 membrane, # 5236 D01N, previously rendered hydrophilic via treatment with HPC according to the above procedure was cationically charge-modified with HEPEI alone by treatment with 2% HEPEI in an aqueous solution at pH 12 for a few seconds and then heat crosslinked at 150° C., for 5 minutes. The membrane was then neutralized with hydrochloric acid (pH 3) and heat dried. The cationic properties were evaluated by anionic dye absorption measurements according to the method of Example I. The results showed 92.6% anionic dye retention with a dye flow rate of 16.7 ml/min and Coulter MFP size of 0.21 μm. These results indicate that while good flow properties can be achieved using HEPEI alone, such a treatment results in insufficient cationic charge modification. This is in direct contrast to the results achieved with Kymene cationic charge modification alone (sample 3c) wherein sufficient cationic charge modification was achieved, but with a poor flow rate. Therefore, while it is possible to produce acceptable cationic charge-modified membranes with a single cationic charge-modifying agent of the present invention, the best results are most often achieved with the simultaneous use of one of each of the cationic charge-modifying agent types, such as, for example, HEPEI and Kymene 736 together.

Example IV

Charge Modification of Very Large Pored Microfiltration Membranes

A 5 μm polysulfone membrane that was rendered hydrophilic through treatment with HPC as described above was then charge-modified in accordance with the invention, as follows: The membrane was dipped into a charge-modifying solution containing 0.8% HEPEI and 1.2% Kymene 736 having a pH of between about 8 and about 8.5 for about 30 seconds. The still wet membrane was passed through a 115° C. oven for three minutes to effect crosslinking.

The samples showed excellent anionic dye retention: a 50 ml solution of dilute Metanil Yellow (10 ppm) was filtered through 25-mm disks of the membrane samples in an Amicon test cell at 6 psid and the recovered permeate was determined to be completely clear by UV-visible spectrophotometry, indicating 100% dye retention.

Example V

Comparison of HPC-Treated Polysulfone Membranes Versus HPC-Treated and Charge-modified Polysulfone Membranes Three microporous polysulfone membrane samples (0.1 μm average surface pore size, available from Memtec America Corporation), rendered hydrophilic with HPC in accordance with the invention, were utilized in a comparative test. One membrane sample was kept untreated (5a), a second membrane was charge-modified via dip-coating in a solution containing 1% HEPEI and 1.2% Kymene 736 (5b), and a third membrane sample was charge-modified via dip-coating in a solution containing 0.5% HEPEI and 0.6% Kymene 736 at a pH of about 8 to about 8.5 (5c). Following treatment, while still wet, Samples 5b and 5c were passed through an oven at about 115° C., for about four minutes to effect crosslinking.

A 50 ml solution of dilute Metanil Yellow (10 ppm) was filtered through 25-mm disks of the membrane samples in an Amicon test cell at 6 psid with the treated samples showing excellent anionic dye retention. The results are shown in Table II.

TABLE II

| Sample No. | Membrane Type and Treatment | Anionic Dye Retention (%) | Dye Solution Flow Rate (ml/min) |
|---|---|---|---|
| 5a | 0.1 μm; no treatment | 17 | 14 |
| 5b | 0.1 μm; 1% HEPEI and 1.2% Kymene 736; crosslinked at 115° C. for 4 minutes | 99.9 for more than 100 ml permeate | 10.4 |
| 5c | 0.1 μm; 0.5% HEPEI and 0.6% Kymene 736; crosslinked at 115° C. for 4 minutes | 99.9 for more than 50 ml permeate | 13.8 |

Again, the results show that treatment, with cationic charge-modifying agents, of a membrane that previously has been rendered hydrophilic with a wetting agent, produces optimal anionic dye retention with little effect on dye solution flow rate under specific treatment conditions.

Example VI

Comparison of HPC-Treated Polysulfone Membranes Versus HPC-Treated and Charge-modified Polysulfone Membranes Four microporous polysulfone membrane samples (0.2 μm average surface pore size, BTS-80, available from Memtec America Corporation), rendered hydrophilic with HPC in accordance with the invention, were utilized in a comparative test. One membrane sample was kept untreated (6a), and a second membrane was charge-modified by dip-coating in a solution containing 1% HEPEI and 1.2% Kymene 736 (6b). A third membrane sample was charge-modified by dip-coating in a solution containing 0.1% HEPEI and 0.12% Kymene 736 (6c), and a fourth membrane sample was treated with 0.2% poly G-20 and 0.2% Kymene 736 at a pH of about 8 to about 8.5 (6d). Following treatment, while still wet, Samples 6b, 6c and 6d were passed through an oven at about 115° C., for about four minutes to effect crosslinking.

A 100 ml solution of dilute Metanil Yellow (10 ppm) was filtered through 25-mm disks of the membrane samples in an Amicon test cell at 10-psid with two of the treated samples showing excellent anionic dye retention. The results are shown in Table III.

TABLE III

| Sample No. | Membrane Type and Treatment | Anionic Dye Retention (%) | Dye Solution Flow Rate (ml/min) |
|---|---|---|---|
| 6a | BTS-80, 0.02 μm; no treatment | 10 | 18.7 |
| 6b | BTS-80, 0.02 μm; 1% HEPEI and 1.2% Kymene 736; crosslinked at 115° C. for 4 minutes | 99.4 | 18 |
| 6c | BTS-80, 0.02 μm; 0.1% HEPEI and 0.12% Kymene 736; crosslinked at 115° C. for 4 minutes | 30 | 19 |
| 6d | BTS-80, 0.02 μm; 0.2% poly G-20 and 0.2% Kymene 736; crosslinked at 115° C. for 4 minutes | 99.9 | 18 |

These results show that treatment, with cationic charge-modifying agents, of a membrane that previously has been rendered hydrophilic with a wetting agent, produces optimal anionic dye retention with little effect on dye solution flow rate under specific treatment conditions. High anionic dye retention can also be achieved with a low molecular weight polyethyleneimine cationic charge-modifying agent, poly G-20, in combination with Kymene 736 treatment.

Example VII

Latex Bead Challenge

Membrane samples as described in Table I (Samples 3h and 3i) were challenged with latex bead solutions containing 0.091 μm beads. Samples 3h and 3i have mean flow pore sizes of 0.2 and 0.21 μm, respectively. Membrane Sample 3h (control, untreated) retained only 9% of the beads while membrane Sample 3i (positively charged membrane) retained 44% of the beads. When challenged with 0.2 μm beads, membrane Sample 3h (control, untreated) retained only 91.6% of the beads while membrane Sample 3i (positively charged membrane) retained 99% of the beads. These results indicate that membranes produced according to the present invention, due to their cationic charge, can remove particles smaller than the pores of the membrane. Pall, et al. (*Colloids and Surfaces* 1 (1980), 235–256), reported that the phenomenon of removal of particles smaller than the pores of a filter is due to adherence of the particles to the pore walls under conditions wherein the particles and the pore walls are oppositely charged or alternatively wherein the zeta potential of the particles and the pore walls of the membrane are both low. Zierdt, in *Applied and Environmental Microbiology,* (1979) 38:1166–1172, also attributed the aforementioned phenomenon to electrostatic forces. The ability to remove particles smaller than the pores of the membrane is an important aspect of the utility of the present invention and is also illustrative of the high filtration efficiency of the membranes produced according to the invention.

Example VIII

Positively Charged PVDF Membrane

Hydrophilic, asymmetric, microporous, polyvinylidene difluoride membranes were prepared in accordance with U.S. patent application Ser. No. 08/785,962, filed Jan. 22, 1997. Membranes of 0.45 μm and 0.2 μm pore sizes were rendered hydrophilic through treatment with HPC in accordance with the present invention. The membrane samples were dip-coated in a charge-modifying solution containing 1% HEPEI and 1.2% Kymene 736 at a pH of about 8 to about 8.5. While still wet, the membrane samples were passed through an oven at about 100° C., for four minutes to effect crosslinking. The samples were tested for anionic dye retention and the results were excellent. In contrast, untreated control membranes showed little, if any, dye retention. This illustrates the versatility of the present invention in treating a variety of membranes.

Example IX

Cationic Membrane Formed from Casting a Mixed Polymer Solution

A casting solution was prepared containing, by weight, 15% polyethersulfone, 34% propionic acid, 2% methylvinylimidazoliummethyl sulfate/vinyl pyrrolidone copolymer, and 49% N-methylpyrrolidone (NMP) as the solvent. Membrane samples were cast onto a moving belt of polyethylene coated paper using a casting knife with a knife gap of 14–15 mils (375–400 $\mu$m). Following casting, the membranes were quenched in water baths of about 22–33° C.

After coagulation, the membranes were washed with deionized water and then air dried. The recovered membranes had thicknesses of between 110 and 130 $\mu$m and were hydrophilic. Each of the membranes was tested for water permeability and protein retention on a 25-mm diameter disk (approximately 3.8 cm$^2$) Amicon stirred cell. SEM micrographs showed an asymmetric membrane structure. The resulting membranes had a molecular weight cut-off of about 100,000 daltons.

This membranes was tested for anionic dye retention and retained 99.9% of the dye from more than 10 ml of dye solution filtered. The membrane was also post-treated with 0.8% HEPEI and 0.96% Kymene 736 aqueous solution and was post-cured at 110° C. for 4 minutes. The retention of anionic dye under such a treatment was further improved; the membrane after treatment was able to efficiently remove the anionic dye from twice the volume of dye solution.

Example X

Cationic Membrane Formed from Casting a Mixed Polymer Solution

A casting solution was prepared containing, by weight, 15% polyethersulfone, 35% propionic acid, 1% methylvinylimidazoliummethyl sulfate/vinyl pyrrolidone copolymer, and 49% NMP as the solvent. Membrane samples were cast onto a moving belt of polyethylene coated paper using a casting knife, with a knife gap of 15 mils (400 $\mu$m). Following casting, the membranes were quenched in a water bath of abut 33° C.

After coagulation, the membranes were washed with deionized water and then air dried. The recovered membranes had thicknesses of between 110 and 125 $\mu$m and were hydrophilic. Each of the membranes was tested for water permeability and protein retention at 55-psid on a 25-mm diameter disk Amicon stirred cell. SEM micrographs showed an asymmetric membrane structure. The resulting membrane had IgG retention of 93.2%.

This membrane was tested for anionic dye retention and retained 99.9% of the dye from more than 10 ml of solution filtered. This membrane was also post-treated with 0.8% HEPEI and 0.096% Kymene 736 aqueous solution and post-cured at 110° C. for 4 minutes. The retention capacity of anionic dye was more than doubled by the post-treatment and post-curing process.

Example XI

Cationic Membranes Formed from a Co-Casting Process

Membranes of several different formulations and pore sizes are prepared according to the co-casting method of the invention. All are hydrophilic and exhibit efficient anionic dye retention. Co-cast membranes that are also post-treated by crosslinking to charge-modifying agents have enhanced anionic dye retention. Formulations are shown in Table IV.

TABLE IV

| % Polymer | % Copolymer | % Acid | Solvent | Post-Treatment | Anionic Dye Retention |
|---|---|---|---|---|---|
| 15% PS | 2% | 34% formic | NMP (balance) | none | >90% from 10 10 ml |
| 15% PES | 2% | 24% acetic | DMF (balance) | none | >90% from 10 10 ml |
| 15% PAS | 2% | 34% propionic | NMP (balance) | none | >90% from 10 10 ml |
| 15% PES | 2% | 34% formic | NMP (balance) | HEPEI | >90% from 20 10 ml |
| 15% PES | 2% | 34% propionic | NMP (balance) | HEPEI + Kymene 736 | >90% from 20 10 ml |
| 15% PAS | 2% | 24% acetic | DMF (balance) | HEPEI + Reten | >90% from 20 10 ml |

EQUIVALENTS

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. A charge-modified polymer membrane, said membrane comprising a hydrophobic polymer, said membrane being rendered hydrophilic by charge-modification, said charge modification resulting from contacting said membrane with at least one polymeric wetting agent and at least one cationic charge modifying agent comprising a polyamine free of any epoxide or epichlorohydrin chemical crosslinking substituents, said charge-modification further resulting from crosslinking to said membrane said cationic charge-modifying agent, wherein said polymeric wetting agent is polyvinylalcohol or a cellulosic polymer comprising a hydrophilic functional group.

2. The membrane of claim 1, wherein said cationic charge modifying agent further comprises an epichlorohydrin-modified polyamine.

3. The membrane of claim 1, wherein said hydrophobic polymer is selected from the group consisting of a sulfone polymer, polyvinylidene difluoride, polytetrafluoroethylene, polypropylene, and polyethylene.

4. The membrane of claim 1, wherein said membrane comprises a flat sheet membrane.

5. The membrane of claim 1, wherein said membrane possesses a pore size of from about 0.0002 $\mu$m to about 10 $\mu$m.

6. The membrane of claim 5, wherein said membrane possesses a pore size of from about 0.01 to about 10 $\mu$m.

7. The membrane of claim 1, wherein said crosslinking comprises energy-induced crosslinking.

8. The membrane of claim 7, wherein said energy-induced crosslinking comprises heating said membrane between about 70° C. and about 200° C. in contact with said cationic charge-modifying agent.

9. The membrane of claim 1, wherein said crosslinking comprises chemically-induced crosslinking.

10. The membrane of claim 9, wherein said chemically-induced crosslinking comprises a peroxide initiator.

11. The membrane of claim 9, wherein said chemically-induced crosslinking comprises a pH above 7.0.

12. The membrane of claim 1, wherein said crosslinking comprises drying said membrane in contact with said cationic charge-modifying agent.

13. A charge-modified polymer membrane, said membrane comprising a hydrophobic polymer, said membrane being rendered hydrophilic by charge-modification, said charge modification resulting from contacting said membrane with at least one polymeric wetting agent and at least one cationic charge modifying agent comprising a polyamine free of any epoxide or epichlorohydrin chemical crosslinking substituents, said charge-modification further resulting from crosslinking to said membrane said cationic charge-modifying agent, wherein said polymer is a sulfone polymer, said sulfone polymer being selected from the group consisting of polysulfone, polyarylsulfone, and polyethersulfone.

14. The membrane of claim 13, wherein said cationic charge modifying agent further comprises an epichlorohydrin-modified polyamine.

15. The membrane of claim 13, wherein said membrane comprises a flat sheet membrane.

16. The membrane of claim 13, wherein said membrane possesses a pore size of from about 0.00021 µm to about 10 µm.

17. The membrane of claim 16, wherein said membrane possesses a pore size of from about 0.01 to about 10 µm.

18. A charge-modified polymer membrane, said membrane comprising a hydrophobic polymer, said membrane being rendered hydrophilic by charge-modification, said charge modification resulting from contacting said membrane with at least one polymeric wetting agent and at least one cationic charge modifying agent comprising a polyamine free of any epoxide or epichlorohydrin chemical crosslinking substituents, said charge-modification further resulting from crosslinking to said membrane said cationic charge-modifying-agent, wherein said membrane comprises a cast polymer membrane.

19. The membrane of claim 18, wherein said cationic charge modifying agent further comprises an epichlorohydrin-modified polyamine.

20. The membrane of claim 18, wherein said hydrophobic polymer is selected from the group consisting of a sulfone polymer, polyvinylidene difluoride, polytetrafluoroethylene, polypropylene, and polyethylene.

21. The membrane of claim 18, wherein said hydrophobic polymer is selected from the group consisting of a sulfone polymer, polyvinylidene difluoride, polytetrafluoroethylene, polypropylene, and polyethylene.

22. The membrane of claim 18, wherein said polymer is selected from the group consisting of polypropylene and polyethylene.

23. The membrane of claim 18, wherein said membrane possesses a pore size of from about 0.00021 µm to about 10 µm.

24. The membrane of claim 23, wherein said membrane possesses a pore size of from about 0.01 to about 10 µm.

25. A charge-modified polymer membrane, said membrane comprising a hydrophobic polymer, said membrane being rendered hydrophilic by charge-modification, said charge modification resulting from contacting said membrane with at least one polymeric wetting agent and at least one cationic charge modifying agent comprising a polyamine free of any epoxide or epichlorohydrin chemical crosslinking substituents, said charge-modification further resulting from crosslinking to said membrane said cationic charge-modifying agent, wherein said membrane comprises a melt-blown polymer membrane.

26. The membrane of claim 25, wherein said polymer is selected from the group consisting of polypropylene and polyethylene.

27. The membrane of claim 25, wherein said cationic charge modifying agent further comprises an epichlorohydrin-modified polyamine.

28. The membrane of claim 25, wherein said hydrophobic polymer is selected from the group consisting of a sulfone polymer, polyvinylidene difluoride, polytetrafluoroethylene, polypropylene, and polyethylene.

29. The membrane of claim 25, wherein said membrane possesses a pore size of from about 0.00021 µm to about 10 µm.

30. The membrane of claim 29, wherein said membrane possesses a pore size of from about 0.01 to about 10 µm.

31. A method of preparing a charge-modified polymer membrane, comprising:

providing a membrane comprising a hydrophobic polymer;

contacting said membrane with at least one polymeric wetting agent and a charge-modifying agent comprising a polyamine free of any epoxide or epichlorohydrin chemical crosslinking substituents, wherein said polymeric wetting agent is polyvinylalcohol or a cellulosic polymer comprising a hydrophilic functional group; and crosslinking to said membrane said cationic charge-modifying agent.

32. The method of claim 31, wherein said hydrophobic polymer is selected from the group consisting of a sulfone polymer, polyvinylidene difluoride, polytetrafluoroethylene, polypropylene, and polyethylene.

33. The method of claim 32, wherein said polymer is a sulfone polymer, said sulfone polymer being selected from the group consisting of polysulfone, polyarylsulfone, and polyethersulfone.

34. The method of claim 31, wherein said crosslinking comprises energy-induced crosslinking.

35. The method of claim 34, wherein said energy-induced crosslinking comprises heating said membrane between about 70° C. and about 200° C. in contact with said cationic charge-modifying agent.

36. The method of claim 31, wherein said polymeric wetting agent is polyvinylalcohol or a cellulosic polymer comprising a hydrophilic functional group.

37. A method of preparing a charge-modified polymer membrane, comprising:

providing a membrane comprising a hydrophobic polymer;

contacting said membrane with at least one polymeric wetting agent and at least one cationic charge-modifying agent comprising a polyamine free of any epoxide or epichlorohydrin chemical crosslinking substituents; and crosslinking to said membrane said cationic charge-modifying agent, wherein said cationic charge-modifying agent further comprises an epichlorohydrin-modified polyamine.

38. The method of claim 37, wherein said polymeric wetting agent comprises a polyvinylalcohol or a cellulosic polymer comprising a hydrophilic functional group.

39. The method of claim 38, wherein said cationic charge modifying agent further comprises hydroxyethylpolyethyleneimine.

40. The method of claim 37, wherein said hydrophobic polymer is selected from the group consisting of a sulfone polymer, polyvinylidene difluoride, polytetrafluoroethylene, polypropylene, and polyethylene.

41. The method of claim 40, wherein said polymer is a sulfone polymer, said sulfone polymer being selected from the group consisting of polysulfone, polyarylsulfone, and polyethersulfone.

42. The method of claim 37, wherein said crosslinking comprises energy-induced crosslinking.

43. The method of claim 42, wherein said energy-induced crosslinking comprises heating said membrane between about 70° C. and about 200° C. in contact with said cationic charge-modifying agent.

44. A method of preparing a charge-modified polymer membrane, comprising:

providing a membrane comprising a hydrophobic polymer;

contacting said membrane with at least one polymeric wetting agent and at least one cationic charge-modifying agent comprising a polyamine free of any epoxide or epichlorohydrin chemical crosslinking substituents; and crosslinking to said membrane said cationic charge-modifying agent, wherein said crosslinking comprises chemically-induced crosslinking.

45. The method of claim 44, wherein said chemically-induced crosslinking comprises a peroxide initiator.

46. The method of claim 44, wherein said hydrophobic polymer is selected from the group consisting of a sulfone polymer, polyvinylidene difluoride, polytetrafluoroethylene, polypropylene, and polyethylene.

47. The method of claim 46, wherein said polymer is a sulfone polymer, said sulfone polymer being selected from the group consisting of polysulfone, polyarylsulfone, and polyethersulfone.

* * * * *